(12) United States Patent
Busuioc

(10) Patent No.: US 6,212,266 B1
(45) Date of Patent: Apr. 3, 2001

(54) FRAUD PREVENTION IN A TELECOMMUNICATIONS NETWORK

(75) Inventor: Marius Nicolae Busuioc, Ipswich (GB)

(73) Assignee: British Telecommunications public limited company, London (GB)

(*) Notice: Subject to any disclaimer, the term of this patent is extended or adjusted under 35 U.S.C. 154(b) by 0 days.

(21) Appl. No.: 09/029,282
(22) PCT Filed: Mar. 26, 1997
(86) PCT No.: PCT/GB97/00866
 § 371 Date: Feb. 25, 1998
 § 102(e) Date: Feb. 25, 1998
(87) PCT Pub. No.: WO97/37487
 PCT Pub. Date: Oct. 9, 1997

(30) Foreign Application Priority Data

Mar. 29, 1996 (GB) .................................................. 9606792

(51) Int. Cl.⁷ ...................................................... H04M 3/00
(52) U.S. Cl. .......................... 379/189; 379/114; 379/134; 379/145
(58) Field of Search .................................... 379/114, 188, 379/189, 134, 115, 93.04, 145

(56) References Cited

U.S. PATENT DOCUMENTS

| | | |
|---|---|---|
| 4,182,934 | 1/1980 | Keys et al. . |
| 5,420,910 | 5/1995 | Rudokas et al. . |
| 5,495,521 * | 2/1996 | Rangachar .......................... 379/93.04 |
| 5,524,145 * | 6/1996 | Parker ............................... 379/112 X |
| 5,602,906 | 2/1997 | Phelps . |
| 5,768,354 * | 6/1998 | Lange et al. ...................... 379/112 X |
| 5,875,236 * | 2/1999 | Sankowitz et al. ................... 379/114 |
| 5,907,602 * | 5/1999 | Peel et al. ............................. 379/114 |

FOREIGN PATENT DOCUMENTS

| | | |
|---|---|---|
| 0583135 A2 | 2/1994 | (EP) . |
| 0618713 A2 | 10/1994 | (EP) . |
| 0653868 A2 | 5/1995 | (EP) . |
| 0661863 A2 | 7/1995 | (EP) . |
| WO 94/11959 | 5/1994 | (WO) . |

* cited by examiner

Primary Examiner—Creighton Smith
(74) Attorney, Agent, or Firm—Nixon & Vanderhye

(57) ABSTRACT

A method and system for detecting fraud in a telecommunications network matches information on individual calls to a series of rules (18). For each rule r, a threshold $T_r$ is defined, and if the fit of an individual call to that rule is exceeds $T_r$, an alarm is generated. All call records resulting in alarms are stored within a positive matching file. Likewise, calls which just fail to meet the criteria, within a given tolerance level $\Theta$, are stored in a separate negative matching file. The entries in the positive and negative matching files are then checked by skilled operators to determine which in fact represent true fraud. On the basis of those validations, a decision module within the system automatically calculates and implements the necessary changes to the thresholds $T_r$ by means of a feedback loop.

37 Claims, 1 Drawing Sheet

FRAUD PREVENTION IN A TELECOMMUNICATIONS NETWORK

BACKGROUND OF THE INVENTION

1. Field of the Invention

The present invention relates to a telecommunications network and more particularly to a method of, and a system for, improving fraud detection within a telecommunications network.

2. Description of Related Art

Rule-based fraud detection systems attempt to detect fraudulent usage by comparing details of individual calls over the telecommunications network with a series of one or more predefined rules. If a particular usage of the network to be referred to throughout this specification as a "call record") triggers one or more of the predefined rules, an alarm is generated, enabling a human operator to take the necessary action. While such systems have had some success in combating fraud, they tend to be labor intensive since the rules tend to be specific to one particular area, and need to be set up and continually maintained by skilled personnel. One set of rules, for example, needs to be set up and maintained to deal with potential mobile telephone fraud, another set for calling card and credit card fraud, another set for PSTN fraud, and so on. A further serious drawback is that in time fraudsters get to know (deduce) the rules and/or thresholds that are being applied, and can modify their behavior accordingly (e.g., "surfing under the thresholds"). For example, if a fraudster knows that he will be detected if he makes a fraudulent international telephone call to a particular number lasting more than thirty minutes, he is likely to start ensuring that all of his calls last for less than that. Conventional systems have difficulty in coping with this, since the rules need to be changed by experienced personnel who are frequently in possession of insufficient information to determine what the effect on the system would be if they were for example to set a reduced time limit of say twenty minutes.

SUMMARY OF THE INVENTION

It is an object of the present invention at least to alleviate these problems of the prior art.

It is a further object to provide a method and system for improving fraud detection within a telecommunications network which can be applied to a variety of specific areas, and which requires less use of skilled personnel to keep the rules up to date.

According to a first aspect of the invention there is provided a system for improving fraud detection within a telecommunications network, the system comprising:

(a) means for receiving call records representative of calls on the network;
(b) rule-matching means arranged to compare each call record against an alarm-rule and
  (i) to determine a match if the alarm-rule matches the call record;
  (ii) to determine a near-match if the alarm-rule just fails to match the call record;
(c) validation means for validating the individual matched records and the near-matched records with an indication of expected fraud; and
(d) rule-update means arranged to alter the said alarm rule in dependence upon the validated matched and validated near-matched records.

The system preferably attempts to detect fraudulent usage by measuring and comparing the parameters values of individual calls, over the telecommunications network, against pre-set thresholds within defined detection rules. Preferably, the rule matching means is arranged to calculate a rule-matching value dependent upon the closeness of match of the call record parameters to the alarm rule, the rule matching means determining a match if the rule matching value exceeds a first threshold parameter of the alarm rule. It will be understood of course that the first threshold parameter merely acts as a limit value, which will be exceeded in the upward-going direction if the rule-matching value increases with the accuracy of the match, and will be exceeded in the downwardly-going direction in the opposite but mathematically equivalent alternative in which the rule-matching value decreases with the accuracy of the match.

Typically, the matched records will be stored in a positive matching file, and the near-matched records in a negative matching file. Entries are stored within the positive matching file if the first threshold parameter is exceeded, by a parameter of the call record and in the negative matching file if a second threshold parameter is exceeded, but the first is not. The second threshold parameter may be defined by the first threshold parameter adjusted by a tolerance value, for example 10%. In this way, the records stored within the negative matching file are representative of calls which almost, but not quite, resulted in an alarm.

In a practical arrangement, the system may include a plurality of different rules, each having its own first threshold and tolerance value. The rules may be updated individually, each individual rule being updated in dependence upon the validated matched and validated near-matched records which correspond with that rule.

According to a second aspect of the invention there is provided a method of improving fraud detection within a telecommunications network, the method comprising:

(a) receiving call records representative of calls on the network;
(b) comparing each call record against an alarm rule and
  (i) determining a match if the alarm rule matches the call record;
  (ii) determining a near-match if the alarm-rule just fails to match the call record;
(c) validating the individual matched records and the near-matched records with an indication of expected fraud; and
(d) altering the said alarm rule in dependence upon the validated matched and validated near-matched records.

DETAILED DESCRIPTION OF THE PREFERRED EMBODIMENTS

Figure 1:
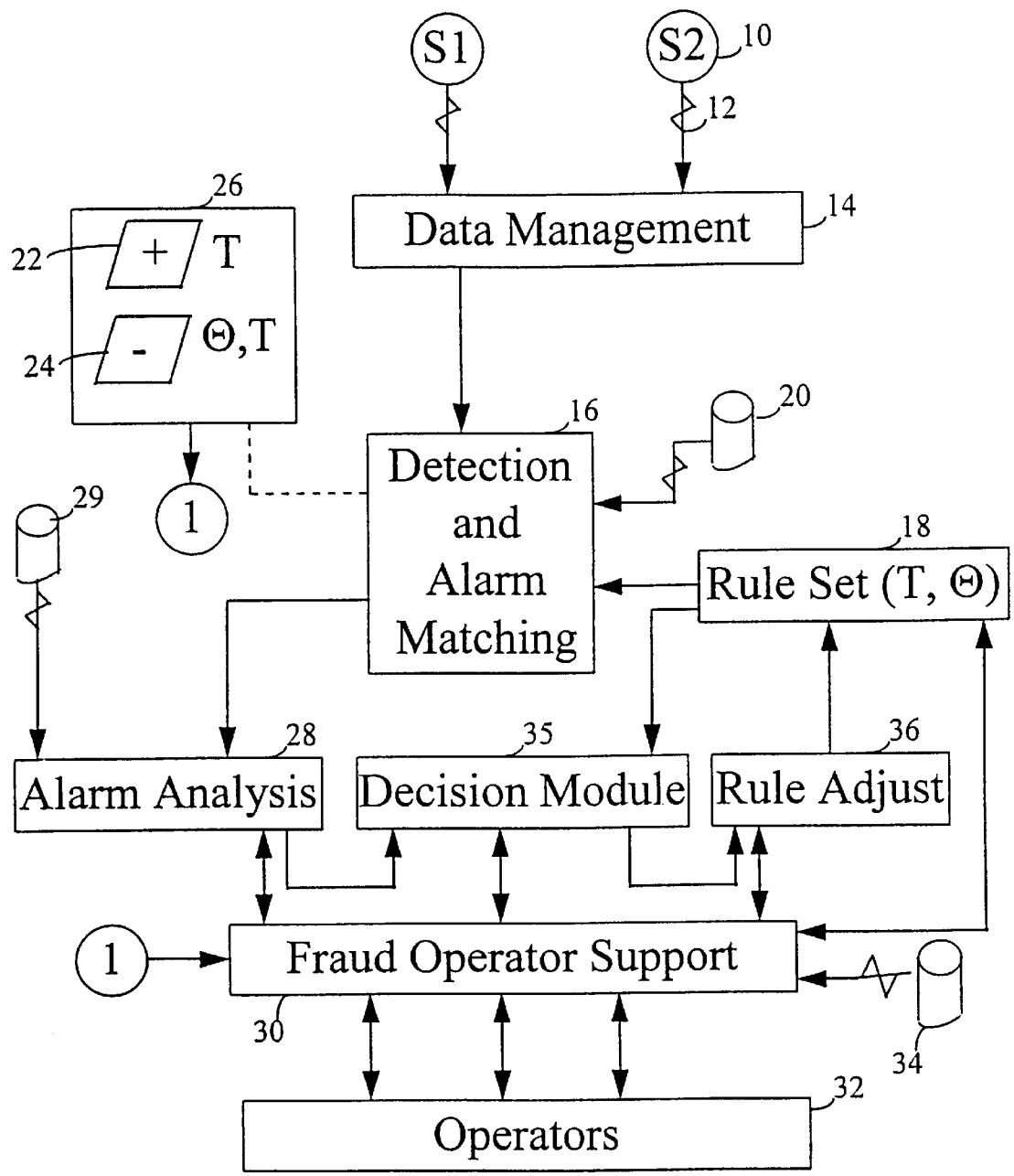
FIG. 1 is a block diagram illustrating the fraud detection system in accordance with an embodiment of the present invention.

The invention may be carried into practice in a number of ways and one specific method and system will now be described, by way of example, with reference to FIG. 1 which is a block diagram illustrating the preferred embodiment.

The fraud detection system shown may typically be embodied in a computer program running on a dedicated server which is attached to the telecommunications network to be monitored. Depending on the size of the network, there may be a single server, or the system may be duplicated on several servers, spaced apart across the network. All or part of the system could alternatively be hard-coded rather than being embodied by way of a computer program; preferably, the hard-coded modules will be those that need not be updated in use.

The system receives information from external sources $S_1, S_2$, across the network. In FIG. 1, the external sources are referenced by the numeral 10, with the broken line 12 indicating that these sources supply information from outside the server on which the system is operating.

The external sources 10 provide information on calls that are being made on the telecommunications network by way of an individual call record for each call. Each call record has a number of key fields, for example (among others) the called number, the calling number, the call length, and the calling card or credit card number. Depending upon the parameters to be monitored, other key fields may be provided as necessary.

The call records are supplied to a data management module 14 which normalized the incoming information and supplies the resultant normalized call records $C_i$ (i being an index identifying the individual calls) to a detection and alarm matching module 16.

In the detection and alarm matching module 16 each of the call records $C_i$ is compared against a series of predefined rules within a rule set 18. The individual rules within the rule set are chosen in such a way that the matching of a rule by the call record $C_i$ provides an indication (although not an absolute proof) that fraud may be taking place. For example, one rule might state that fraud is a possibility if the call is an international call being made from a public call box to a country known to be a supplier of illegal drugs. Fraud might also be suspected if the call has been paid for by a charge card and does not fit the call history on that account; a rule might suggest that fraud is taking place, for instance, if a low-usage charge card customer suddenly starts making a long series of international telephone calls to different countries from a public telephone box. Additional information from an external or internal database 20 may be accessed in order to obtain the necessary information to apply the rules for example, the billing history of the customer, the customer's charge card credit limit (which may vary on a day by day or even on an hourly basis), and so on.

Each rule r within the rule-set has associated with it a corresponding threshold value $T_r$, and the call record $C_i$ is tested against the rule in such a way as to provide an indication of the "degree of match" $V_i$. If the rule closely matches the call record, the value of $V_i$ will be high, and if the match is poor the value of $V_i$ will be low. The value $V_i$ is then tested against the rules threshold $T_r$, and an alarm is generated if $V_i$ is greater than $T_r$. In the prior art systems, the value of $T_r$ would correspond to that threshold level above which the alarms are presented to a human operator for further checking.

It will be appreciated that there are numerous way in which the "degree of matching", otherwise indicated by $V_i$ may be determined. One simplistic approach would be to set $V_i$ to 1 if one of the parameters in the rule being tested is satisfied, to 2 if two of the parameters are satisfied and so on. In such a system, the parameters might consist of various "true or false" statements, within the rule, for example that the call is an international call, that it has lasted longer than a certain period, that it has exceeded a certain cost, or that it relates to a particular calling or called address. Since some of the parameters will be more indicative of frauds than others, a more sophisticated approach might be to apply appropriate weightings to each of the parameters, and to calculate $V_i$ on that basis. Other more complex arrangements could of course be envisioned, subject only to the module 16 producing as an output a value $V_i$ which gives some indication of the likelihood of the current call being fraudulent, based upon the particular rule being tested.

Each time that an alarm is generated a tuple $(C_i, r, Q_i^+)$ is stored on disk 26 within a "positive matching file" 22. These may be called the "matched records". In this tuple:

$C_i$ is the call record (itself consisting of a number of key fields), r is the index of the rule which generated the alarm, and $Q_{i+}$ is the "positive matching ratio", namely the ratio by which the requirements of the rule (eg exceeding the rule threshold) have been exceeded. This is defined as $ABS(T_r - V_i)/T_r$, where $ABS(X)$ represents the absolute value of X.

Also associated with each rule r is a further parameter $\Theta_r$, which may be defined as a tolerance margin to the value of $T_r$. $\Theta_r$ may, for example, be 0.1 or 10%. The module 16 uses this value of $\Theta_r$ to keep track of those calls $C_i$ which just fail to trigger an alarm on rule $r$. For those cases in which $V_i$ is less than $T_r$, a "negative matching ratio" $Q_i^-$ is determined using the formula $ABS(T_r - V_i)/T$. If $Q_i^-$ is less than $\Theta_r$, then the module determines that the call $C_i$ represents a "near miss alarm". For all such calls, the tuple $(C_i, r, Q_i^-)$ is stored in a negative matching file 24. Here, $C_i$ and r are as before, with $Q_i^-$ representing the ratio by which the call record has just missed triggering an alarm on rule r (e.g., the ratio by which the rule threshold has just been missed). These may be called the "near-matched records".

Both the positive matching file 22 and the negative matching file 24 are ordered according to their respective ratios $Q_i^+$, $Q_i^-$. Accordingly, the positive matching file 22 may be thought of as a series of records giving rise to fraud alarms, whereas the negative matching file represents those records which have almost but not quite triggered alarms. In each case, the files are ordered so that the most likely fraudulent cases are at the start. While the entire positive matching file is preferably presented, to allow for the analysis of alarms, not all of the negative matching file need be presented. For example, presenting only those records which are grouped around the mean value of $Q_i^-$ will improve efficiency. Alternatively, only the call records carrying significant cost values can be presented.

Both the negative and the positive matching files are passed (as indicated by the circled numeral 1) to a fraud operator support module 30, allowing the files to be viewed and analysed by human operators 32. The operators 32 use their experience of fraud detection to validate the entries in the positive and negative matching files 22,24, each entry being given a code according to whether it is considered by the operator to represent true fraud or not. Ideally, all of the entries in the positive matching file 22 should represent fraudulent calls, and all the entries in the negative matching file should represent non-fraudulent calls, but in practice there will be both fraudulent and non-fraudulent entries within both of the files because of inaccuracies in the rule set 18. In order to assist their analysis of what is and what is not fraud, the operators 32 may call on additional information provided from internal or external sources 34. This may include, for example, the name and address of the customer, the billing history, the account history, the pattern of frauds which has been seen in the past, and so on. The fraud operator support 30 may include a series of graphical analysis tools enabling the operators to view the alarms and the files 22,24 in a variety of useful ways. It may also include an expert system and/or neural nets to assist the operators in making their analysis; the fraud operator support may even operate without user intervention, simply being programmed to validate the records for example on the basis of a neural net analysis.

The annotations/validations of the files 22,24 are passed back to the alarm analysis module 28 the primary purpose of which is to provide automatic feedback for adjusting the rule set 18. The alarm analysis module computes two ratios $X_r, Y_r$ for each rule r, where:

$X_r$=the ratio of the number of validated frauds in the positive matching file to the total number of alarms generated by rule r in the positive matching file, and $Y_r$=the ratio of the number of validated frauds in the negative matching file to the total number of alarms generated by rule r in the positive matching file.

The value of $X_r$ represents one measure of the performance of rule r, in that the higher $X_r$ is the better. The value of $Y_r$ is another measure of the performance of rule r, but here the lower the value of $Y_r$ the better.

It will be understood that in order to improve (increase) the value of $X_r$, the value of $T_r$ needs to be increased: to improve (decrease) the value of $Y_r$ the threshold $T_r$ needs to be decreased.

The values $X_r, Y_r$ are then applied to a decision module 35 which uses the values within a function f which will automatically increase or decrease the threshold $T_r$ for the rule r, as follows:

$$\delta T_r = f(X_r, Y_r, \text{cost})$$

where "cost" represents the cost of the fraud going undetected. The appropriate change to $T_r$ is made by a rule adjust module 36, which alters the rule set 18, thereby further improving the detection and alarm matching within the module 16.

It will be understood by those skilled in the art that it is not essential to the operation of this invention in its broadest form for the function f to be exactly as described. Other parameters could be extracted from the files 22,24 and the validated records within them, other than the values $X_r$ and $Y_r$ previously described. In one alternative, $X_r$ could represent the ratio of the number of validated alarms to the number of false positives, whereas $Y_r$ could represent the ratio of the number of tuples stored in the negative matching file which are true indications of fraud, to the total number of tuples in the negative matching file. Alternatively, entirely different parameters could be constructed which may include information from internal or external sources such as the database 29. Weights $W_x, W_y$ may be associated with $X_r, Y_r$ respectively.

If cost information is used as part of the function f, that may be calculated by looking at the individual costs for each separate record (for example the cost of each individual call). One convenient cost parameter that may be included within f is the speed at which the potential losses due to fraud are increasing. If the losses are rising rapidly, one needs to be more drastic than one might otherwise be in changing the rule thresholds. One convenient way of doing this would be to plot a moving average over time of the total validated frauds that the system is detecting. The first derivative of this graph may be incorporated as a parameter within f, ensuring that the thresholds are more aggressively changed when losses are most rapidly increasing. In other embodiments, cost need not be a feature of the function f, but other practical considerations could be included, for example the ease with which a particular fraud can be dealt with. Those skilled in the art will be able to decide many appropriate functions f, by trial and error, curve fitting or otherwise, to provide suitable feedback to the rule adjust module 36: typically, the function f will be designed so that the threshold values $T_r$ are more aggressively changed for potentially expensive frauds. In one embodiment, the decision module 35 may receive information on the rules directly from the current rule-set 18, thereby providing an additional level of feedback.

In one form of the invention, the function f does not automatically increase or decrease the threshold $T_r$, but instead recommends to the operators the changes that should be made. In one preferred embodiment, the recommendations may be presented to a fraud analyst (having higher responsibility than the fraud operators). If the analyst accepts the appropriate recommendation, then the change to $T_r$ is made by the rule tuning module 36, which alters the ruleset 18, thereby further improving the detection and alarm generation within the module 16.

One option for the function f is as follows:
  (a) If $X_r$ is >80%:
    Then DO NOTHING—good performance (and set the weight $W_x$=0) ELSE RECOMMEND $T_r$ to be increased
  (b) If $Y_r$ is <20%:
    Then DO NOTHING—good performance (and set the weight $W_y$=0) ELSE RECOMMEND $T_r$ be decreased.

Where $W_x$ and $W_y$ are the weights attached respectively to $X_r$ and $Y_r$.

The weights $W_x$ and $W_y$ may be set by monitoring and plotting the values $X_r$ and $Y_r$ with time, and periodically computing the ratios dX/dt and dY/dt for each time interval. These ratios will be called a and b respectively. Then a method to set the weights $W_x, W_y$ may be carried out as follows: For $W_x$:
  (a) low (0.1–0.3) IF a(t2)>a(t1)>0; t2>t1;—indication of good performance therefore weak support for increasing $T_r$;
  (b) high (0.8–0.9) IF a(t2)<0 and a(t1)>0; t2>t1;—indication of bad performance therefore strong support to increase $T_r$ and similarly for $W_y$:
  (a) low (0.1–0.3) IF b(t2)<0 and b(t1)>0; t2>t1;—indication of good performance therefore weak support to decrease $T_r$
  (b) high (0.8–0.9) IF b(t2)>b(t1)>0; t2>t1;—indication of bad performance therefore strong support for decreasing $T_r$. In addition one can think about joint effect of $X_r$ and $Y_r$ dynamics to be captured as following:
  IF [(a=0) or (a is decreasing)] and [b is increasing]
    THEN very strong support to decrease the threshold $T_r$
  or
  IF [a is increasing] and [(b=0) or (b is decreasing)]
    THEN very strong support to increase the threshold $T_r$.

The output of the decision module 35 is passed to the rule-adjust module 36 which effects the rule changes to the rule set 18.

Information from the decision module 35 and the rule adjust module 36 is provided to the fraud operator support module 30, to enable the operators 32 to view the current state of the system. Provision may also be provided for the fraud analysis or for the operators to directly intervene in the decisions of the decision module 35, or in the rule adjust module 36, for example by altering some user definable parameters within the function f. The operators may for instance find it convenient for the system to operate slightly differently at weekends, when the volume of calls is likely to be lower, than it is during the week. Also, certain types of fraud might be more prevalent at certain times of the week or at certain times of day, and user-changeable parameters, or automatically-changing parameters may be provided within the function f to allow for this. Also, provision may be made for the fraud operator support module to have direct access to the rule set 18, thereby enabling the operators and/or analysts to see exactly which rules are currently being applied, and to change them manually if necessary.

In one version of the system, the feedback loop may be entirely automated, with the rule set 18 continually being updated as a result of the decisions of the decision module 35. Depending on the computational complexity, which of course depends upon the number of call records and on the number and complexity of the rules, the rules may either be adjusted continually in real time, or may alternatively be updated on a "batch" basis. In another version of the system, the rule set is updated only when requested by a signal sent by a human operator 32 to the rule adjust module 36, or by a signal automatically generated by the fraud operator support module 30.

Further information may be obtained by considering the distribution of the various individual values of $Q_i^-$ for the validated fraud records within the negative matching file. These represent calls which the operators consider to be fraudulent, but which are not currently being correctly trapped by the system and placed in the positive matching file. If it is found that most of the values of $Q_i^-$ are much less than the value of $\Theta$, it is probable that the value of the tolerance ($\Theta_r$) is too great. The value could then be reduced, so reducing the number of entries in the negative matching file, but without losing many truly fraudulent entries. On the other hand, if the values of $Q_i^-$ of the validated fraudulent entries are spread out fairly equally across the range from 0 to $\Theta_r$, or if they tend to increase as one approaches $\Theta_r$, it can be concluded that a substantial number of fraudulent calls are falling outside the $\Theta_r$ limit, and so are not being trapped either within the positive or within the negative matching file. This would suggest that the value of $\Theta_r$ needs to be increased.

In this way, the value of the tolerance $\Theta_r$ may be altered, either automatically or as requested by an operator, to provide further tuning to the system. As with alterations to $T_r$, the value of $\Theta_r$ may be changed in accordance with a function which depends on the validated matched and near-matched records. The decision module 35 may determine the amount and direction of the necessary change, providing instructions to the rule-adjust module 36.

It will be understood of course that the various modules shown in FIG. 1 are entirely exemplary, and that in other embodiments some of these modules may be combined with others, or arranged differently.

What is claimed is:

1. A system for improving fraud detection within a telecommunications network, the system comprising:
   (a) means for receiving call records representative of calls on the network;
   (b) rule-matching means arranged to compare each call record against an alarm-rule and
      (i) to determine a match if the alarm-rule matches the call record; and
      (ii) to determine a near-match if the alarm-rule just fails to match the call record;
   (c) validation means for validating the individual matched records and the near-matched records with an indication of expected fraud; and
   (d) rule-update means arranged to alter said alarm rule in dependence upon the validated matched and validated near-matched records.

2. A system as claimed in claim 1 in which the rule-matching means is arranged to calculate a rule-matching value dependent upon a closeness of a match of the call record to the alarm rule, the rule-matching means determining a match if the rule-matching value exceeds a first threshold parameter of the alarm rule.

3. A system as claimed in claim 2 in which the rule-matching means determines a near-match if the rule-matching value exceeds a second threshold parameter of the alarm rule.

4. A system as claimed in claim 3 in which the second threshold parameter is defined by the first threshold parameter adjusted by a tolerance value.

5. A system as claimed in claim 2 in which a rule update means is arranged to alter the first threshold parameter of the alarm rule.

6. A system as claimed in claim 3 in which a rule update means is arranged to alter the second threshold parameter of the alarm rule.

7. A system as claimed in claim 5 in which a rule update means is arranged to alter the second threshold parameter in dependence upon a distribution of rule matching values of the near-matched records.

8. A system as claimed in claim 2 in which positive and negative matching files are ordered according to the rule matching values of a respective record.

9. A system as claimed in claim 1 in which the validation means includes validation input means for receiving a user-validation of each record.

10. A system as claimed in claim 1 in which rule matching means is arranged to compare each call record against a plurality of alarm rules, the rule update means being arranged to alter each said alarm rule individually.

11. A system as claimed in claim 10 in which the rule update means is arranged to alter each individual alarm rule in dependence upon the validated matched and near-matched records which correspond to the said individual alarm rule.

12. A telecommunications network including a system as claimed in claim 1.

13. A system for improving fraud detection within a telecommunications network, the system comprising:
   means for receiving call records representative of calls on the network;
   rule-matching means arranged to compare each call record against an alarm-rule and
      to determine a match if the alarm-rule matches the call record; and
      to determine a near-match if the alarm-rule just fails to match the call record;
   validation means for validating the individual matched records and the near-matched records with an indication of expected fraud;
   rule-update means arranged to alter the said alarm rule in further dependence upon the validated matched and validated near-matched records; and
   rule-update means being arranged to alter the alarm rule in further dependence upon an estimated fraud cost.

14. A system as claimed in claim 13 in which the rule update means is arranged to alter the alarm rule in dependence upon a rate at which the estimated fraud cost is changing.

15. A system as claimed in claim 13 in which the rule update means is arranged automatically to alter the alarm rule.

16. A system for improving fraud detection within a telecommunications network, the system comprising:
- means for receiving call records representative of calls on the network;
- rule-matching means arranged to compare each call record against an alarm-rule and
  - to determine a match if the alarm-rule matches the call record; and
  - to determine a near-match if the alarm-rule just fails to match the call record;
- validation means for validating the individual matched records and the near-matched records with an indication of expected fraud;
- rule-update means arranged to alter said alarm rule in dependence upon the validated matched and validated near-matched records; and
- rule-update means arranged to alter the alarm rule only on receipt of a user update request.

17. A system as claimed in claim 1 in which the matched records are stored in a positive matching file and the near matched records are stored in a negative matching file.

18. A system as claimed in claim 1 in which the rule matching means is arranged to compare each call against the alarm rule in dependence upon external database information.

19. A system for improving fraud detection within a telecommunications network, the system comprising:
- means for receiving call records representative of calls on the network;
- rule-matching means arranged to compare each call record against an alarm-rule and
  - to determine a match if the alarm-rule matches the call record; and
  - to determine a near-match if the alarm-rule just fails to match the call record;
- validation means for validating the individual matched records and the near-matched records with an indication of expected fraud;
- rule-update means arranged to alter said alarm rule in dependence upon the validated matched and validated near-matched records; and
- validation means includes means for automatically providing an indication of expected fraud for each record.

20. A method of improving fraud detection within a telecommunications network, the method comprising:
- (a) receiving call records representative of calls on the network;
- (b) comparing each call record against an alarm rule, and
  - (i) determining a match if the alarm rule matches the call record; and
  - (ii) determining a near-match if the alarm-rule just fails to match the call record;
- (c) validating the individual matched records and the near-matched records with an indication of expected fraud; and
- (d) altering said alarm rule in dependence upon the validated matched and validated near-matched records.

21. A method as claimed in claim 20 including calculating a rule-matching value in dependence on a closeness of a match of the call record to the alarm rule, and determining a match if the rule matching value exceeds a first threshold parameter of the alarm rule.

22. A method as claimed in claim 21 including determining a near match if the rule matching value exceeds a second threshold parameter of the alarm rule.

23. A method as claimed in claim 22 in which the second threshold parameter is defined by the first threshold parameter adjusted by a tolerance value.

24. A method as claimed in claim 21 including altering the first threshold parameter of the alarm rule.

25. A method as claimed in claim 22 including altering the second threshold parameter of the alarm rule.

26. A method as claimed in claim 25 including altering the second threshold parameter in dependence upon a distribution of rule matching values of the near-matched records.

27. A method of improving fraud detection within a telecommunications network, the method comprising:
- receiving call records representative of calls on the network;
- comparing each call record against an alarm rule, and
  - determining a match if the alarm rule matches the call record; and
  - determining a near-match if the alarm-rule just fails to match the call record;
- validating the individual matched records and the near-matched records with an indication of expected fraud;
- altering said alarm rule in dependence upon the validated matched and validated near-matched records; and
- altering the alarm rule in further dependence upon an estimated fraud cost.

28. A method as claimed in claim 27 including altering the alarm rule in dependence upon a rate at which the estimated fraud cost is changing.

29. A method as claimed in claim 20 including automatically altering the alarm rule.

30. A method of improving fraud detection within a telecommunications network, the method comprising:
- receiving call records representative of calls on the network;
- comparing each call record against an alarm rule, and
  - determining a match if the alarm rule matches the call record; and
  - determining a near-match if the alarm-rule just fails to match the call record;
- validating the individual matched records and the near-matched records with an indication of expected fraud; and
- altering said alarm rule in dependence upon the validated matched and validated near-matched records; and
- altering the alarm rule only on receipt of a user-update request.

31. A method as claimed in claim 20 including storing the matched records in a positive matching file and the near-matched records in a negative matching file.

32. A method as claimed in claim 21 including ordering the positive and negative matching files according to the rule matching values of the respective records.

33. A method as claimed in claim 20 including comparing each call against the alarm rule in dependence upon external database information.

34. A method of improving fraud detection within a telecommunications network, the method comprising:
- receiving call records representative of calls on the network;
- comparing each call record against an alarm rule, and
  - determining a match if the alarm rule matches the call record; and
  - determining a near-match if the alarm-rule just fails to match the call record;
- validating the individual matched records and the near-matched records with an indication of expected fraud;

altering said alarm rule in dependence upon the validated matched and validated near-matched records; and automatically providing an indication of expected fraud for each record.

35. A method of improving fraud detection within a telecommunications network, the method comprising:

receiving call records representative of calls on the network;

comparing each call record against an alarm rule, and determining a match if the alarm rule matches the call record; and determining a near-match if the alarm-rule just fails to match the call record;

validating the individual matched records and the near-matched records with an indication of expected fraud;

altering said alarm rule in dependence upon the validated matched and validated near-matched records; and providing user-validation of each record.

36. A method as claimed in claim 20 including comparing each call record against a plurality of alarm rules, and altering each said alarm rule individually.

37. A method as claimed in claim 36 including altering each individual alarm rule in dependence upon the validated matched and near-matched records which correspond to the said individual alarm rule.

* * * * *